(12) United States Patent
Barish et al.

(10) Patent No.: US 11,743,592 B2
(45) Date of Patent: *Aug. 29, 2023

(54) SYSTEMS AND METHODS FOR FAST AUTOTUNING OF INDUSTRIAL FIXED VISION CAMERAS

(71) Applicant: ZEBRA TECHNOLOGIES CORPORATION, Lincolnshire, IL (US)

(72) Inventors: Justin F. Barish, Kings Park, NY (US); John Boecio, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,364

(22) Filed: Aug. 31, 2022

(65) Prior Publication Data
US 2022/0417410 A1 Dec. 29, 2022

Related U.S. Application Data

(63) Continuation of application No. 17/246,343, filed on Apr. 30, 2021, now Pat. No. 11,438,518.

(51) Int. Cl.
*H04N 23/72* (2023.01)
*H04N 23/67* (2023.01)
(52) U.S. Cl.
CPC ............ *H04N 23/72* (2023.01); *H04N 23/67* (2023.01)

(58) Field of Classification Search
CPC ............ H04N 5/2352; H04N 5/23212; H04N 5/2353; H04N 23/72; H04N 23/67; H04N 23/71; G06K 7/10732
See application file for complete search history.

(56) References Cited

U.S. PATENT DOCUMENTS

| | | | |
|---|---|---|---|
| 8,632,011 B2 * | 1/2014 | Gao | G06K 7/1443 235/455 |
| 10,650,211 B2 * | 5/2020 | Olivastri | G06K 7/10722 |
| 10,679,024 B2 * | 6/2020 | Bachelder | G06K 7/10811 |
| 2012/0181338 A1 * | 7/2012 | Gao | G06K 7/12 235/455 |

* cited by examiner

*Primary Examiner* — Luong T Nguyen
(74) *Attorney, Agent, or Firm* — Yuri Astvatsaturov (57) ABSTRACT

Systems and methods for fast autotuning of industrial fixed vision cameras are disclosed herein. An example method includes modifying illumination settings of a camera until a brightness value for captured image data reaches a minimum value; modifying a focus level of the camera to determine a range of camera focus levels for successfully decoding barcodes; configuring the camera to operate using a midpoint focus value of the range; modifying illumination settings of the camera until the brightness associated with the captured image data reaches an optimal value; and modifying the focus level of the camera, within the range, to determine an optimal focus level at which sharpness for the captured image is optimized; and capturing, by the camera, operating at the determined optimal focus level and with illumination settings for the optimal threshold brightness value, image data associated with a new target object affixed with a new barcode.

7 Claims, 4 Drawing Sheets

FIG. 4

SYSTEMS AND METHODS FOR FAST AUTOTUNING OF INDUSTRIAL FIXED VISION CAMERAS

CROSS-REFERENCE TO RELATED APPLICATION

This application is a continuation of U.S. patent application Ser. No. 17/246,343, filed on Apr. 30, 2021, and incorporated herein by reference in its entirety.

BACKGROUND

Industrial fixed vision cameras may be used to capture images of target objects in an industrial setting, such as boxes or other objects moving through an industrial setting on a conveyor belt. Captured images of target objects may then be analyzed to decode barcodes or other indicators affixed each object, or to use machine vision to identify the object itself or features thereon (e.g., lines, text, etc.). However, when images of the target objects that are captured by the industrial fixed vision camera are too dark, or not clear, or when there is a glare blocking part of the image, it can be difficult or impossible to accurately decode barcodes attached to the target objects, or to use machine vision to identify the object itself or features thereon.

Consequently, the parameters and/or settings of the industrial fixed vision camera must be tuned to ensure that the target objects, or barcodes or other features thereon, are able to be accurately identified and/or decoded when the images are subsequently analyzed. However, there are a large number of camera parameters that must be tuned, and each parameter has a large number of possible settings. For instance, these parameters may include focus (up to 1023 possible settings), exposure (over 10,000 possible settings), gain (about 5 possible settings that are worthwhile checking), illumination Intensity (up to 10 possible settings), illumination color (up to 5 possible settings), and which illumination LED banks are illuminated (N, S, E, W) (up to 15 possible settings). That is, given the number of possible settings for each parameter, there are hundreds of thousands of possible combinations of configurations.

Accordingly, as attempting every possible combination is not feasible, an efficient process for automatically tuning an industrial fixed vision camera is needed.

SUMMARY

In an embodiment, the present invention is a method, comprising: tuning an imaging assembly configured to capture image data associated with a first target object affixed with a first barcode, by: (a) incrementally modifying illumination settings associated with the imaging assembly until a brightness value associated with the captured image data reaches a minimum threshold brightness value; (b) incrementally modifying a focus level associated with the imaging assembly to determine a range of imaging assembly focus levels at which the first barcode can be successfully decoded; (c) configuring the imaging assembly to operate using a midpoint focus value of the range of focus levels; (d) incrementally modifying the illumination settings associated with the imaging assembly until the brightness associated with the captured image data reaches an optimal threshold brightness value; and (e) incrementally modifying the focus level associated with the imaging assembly, within the range of imaging assembly focus levels at which the first barcode can be successfully decoded, to determine an optimal focus level for the imaging assembly at which a sharpness level for the captured image is optimized; and capturing, by the imaging assembly operating at the determined optimal focus level and with illumination settings for the optimal threshold brightness value, image data associated with a second target object affixed with a second barcode.

In a variation of this embodiment, the illumination settings associated with the imaging assembly include one or more of an exposure, a gain, an illumination intensity, or a number of illuminated illumination banks associated with the imaging assembly.

Furthermore, in a variation of this embodiment, incrementally modifying the illumination settings associated with the imaging assembly at steps (a) and (d) includes: (i) incrementally increasing an exposure level associated with the imaging assembly from a minimum exposure value to a maximum exposure value; (ii) when the exposure level associated with the imaging assembly is set to the maximum exposure value, incrementally increasing a gain level associated with the imaging assembly, by one increment, from a minimum gain value and repeating step (i); (iii) when the gain level associated with the imaging assembly is set to the maximum gain value, and the exposure level associated with the imaging assembly is set to the maximum exposure value, incrementally increasing an illumination intensity level associated with the imaging assembly, by one increment, from a minimum illumination intensity value and repeating steps (i)-(ii); and (iv) when the illumination level associated with the imaging assembly is set to the maximum illumination value, the gain level associated with the imaging assembly is set to the maximum gain value, and the exposure level associated with the imaging assembly is set to the maximum exposure value, incrementally increasing a number of illumination banks associated with the imaging assembly that are illuminated, by one, from a minimum number of illuminated illumination banks, and repeating steps (i)-(iii), until a maximum number of illumination banks associated with the imaging assembly are illuminated.

Additionally, in a variation of this embodiment, determining the brightness value associated with the captured image data includes creating a histogram of pixel intensity values associated with each pixel of the captured image data and determining, using the histogram, a pixel intensity threshold value below which a majority of the pixel intensity values associated with the pixels of the captured image data fall. For instance, the minimum threshold brightness value may be associated with a first pixel intensity threshold value, the optimal threshold brightness value may be associated with a second pixel intensity threshold value, and the second pixel intensity threshold value may be higher than the first pixel intensity threshold value.

Furthermore, in a variation of this embodiment, incrementally modifying the focus level associated with the imaging assembly to determine a range of imaging assembly focus levels at which the first barcode can be successfully decoded at step (b) includes: (i) incrementally increasing a focus level associated with the imaging assembly, from a minimum focus level associated with the imaging assembly, by a first focus level increment; (ii) attempting to decode the first barcode after each incremental focus level increase of step (i) and repeating step (i) until a minimum threshold focus level at which the first barcode can be successfully decoded is reached; (iii) incrementally increasing a focus level associated with the imaging assembly, from the minimum threshold focus level, by a second focus level increment; (iv) attempting to decode the first barcode after each incremental focus level increase of step (ii) and repeating step (ii) until an overshot focus level at which the first barcode can no longer be successfully decoded is reached; (v) incrementally decreasing a focus level associated with the imaging assembly, from the maximum overshot focus level, by the first focus level increment; (vi) attempting to decode the first barcode after each incremental focus level decrease of step (v) and repeating step (v) until a maximum threshold focus level at which the first barcode can again be successfully decoded is reached; and (vii) determining that the range of imaging assembly focus levels at which the first barcode can be successfully decoded is a range from the minimum threshold focus level to the maximum threshold focus level. For instance, in some examples, the first focus level increment is a minimum focus level increment for the imaging assembly. Moreover, in some examples, the second focus level increment is a larger increment than the first focus level increment. Additionally, in some examples, the second focus level increment is the same as the first focus level increment.

Moreover, in a variation of this embodiment, incrementally modifying the focus level associated with the imaging assembly, within the range of imaging assembly focus levels at which the first barcode can be successfully decoded, to determine an optimal focus level for the imaging assembly at which a sharpness level for the captured image is optimized, at step (e) includes: (i) determining respective sharpness levels for image data captured at each of the minimum threshold focus level, midpoint focus level, and maximum threshold focus level of the range of focus levels; (ii) narrowing the range of focus levels to a modified range of focus levels that is either: (1) a range from the minimum threshold focus level to the midpoint focus level or (2) a range from the midpoint focus level to the maximum threshold focus level, based on the determined sharpness levels for image data captured at each of the minimum threshold focus level, midpoint focus level, and maximum threshold focus level of the range of focus levels; and (iii) determining respective sharpness levels for image data captured at each of a modified minimum focus level, a modified midpoint focus level, and a modified maximum focus level of the modified range of focus levels; and (iv) repeating steps (ii) and (iii), until one of the modified minimum focus level, the modified midpoint focus level, or the modified maximum focus level, of the modified range of focus levels, is an optimal focus level, at which a sharpness level for the captured image data is maximized.

Furthermore, in a variation of this embodiment, the optimal threshold brightness value is a first optimal threshold brightness value, and the method further includes modifying one or more of: minimum or maximum exposure levels, gain levels, illumination intensity levels, or numbers, configurations, or colors of respective illumination banks associated with the imaging assembly, and repeating steps (a) and (e) to determine a second optimal threshold brightness value.

Additionally, in a variation of this embodiment, the method further comprises, at step (e), when incrementally modifying illumination settings associated with the imaging assembly results in the first barcode no longer being successfully decoded: modifying, using a binary search algorithm, one or more of the illumination intensity level associated with the imaging assembly, the number or configuration of illumination banks associated with the imaging assembly that are illuminated, or the colors of one or more of the respective illumination banks associated with the imaging assembly, until the first barcode can again be successfully decoded.

In another embodiment, the present invention is a method, comprising: tuning an imaging assembly configured to capture image data associated with a first target object, by: (a) incrementally modifying illumination settings associated with the imaging assembly until a brightness value associated with the captured image data reaches a minimum threshold brightness value; (b) configuring the imaging assembly to operate using a midpoint focus value of a range of focus levels associated with the imaging assembly; (c) incrementally modifying the illumination settings associated with the imaging assembly until the brightness associated with the captured image data reaches an optimal threshold brightness value; and (d) incrementally modifying the focus level associated with the imaging assembly, within the range of focus levels associated with the imaging assembly, to determine an optimal focus level for the imaging assembly at which a sharpness level for the captured image is optimized; and capturing, by the imaging assembly, operating at the determined optimal focus level, and with illumination settings for the optimal threshold brightness value, image data associated with a second target object.

In a variation of this embodiment, the illumination settings associated with the imaging assembly include one or more of an exposure, a gain, an illumination intensity, or a number of illuminated illumination banks associated with the imaging assembly.

Furthermore, in a variation of this embodiment, incrementally modifying the illumination settings associated with the imaging assembly at steps (a) and (c) includes: (i) incrementally increasing an exposure level associated with the imaging assembly from a minimum exposure value to a maximum exposure value; (ii) when the exposure level associated with the imaging assembly is set to the maximum exposure value, incrementally increasing a gain level associated with the imaging assembly, by one increment, from a minimum gain value and repeating step (i); (iii) when the gain level associated with the imaging assembly is set to the maximum gain value, and the exposure level associated with the imaging assembly is set to the maximum exposure value, incrementally increasing an illumination intensity level associated with the imaging assembly, by one increment, from a minimum illumination intensity value and repeating steps (i)-(ii); and (iv) when the illumination level associated with the imaging assembly is set to the maximum illumination value, the gain level associated with the imaging assembly is set to the maximum gain value, and the exposure level associated with the imaging assembly is set to the maximum exposure value, incrementally increasing a number of illumination banks associated with the imaging assembly that are illuminated, by one, from a minimum number of illuminated illumination banks, and repeating steps (i)-(iii), until a maximum number of illumination banks associated with the imaging assembly are illuminated.

Additionally, in a variation of this embodiment, determining the brightness value associated with the captured image data includes creating a histogram of pixel intensity values associated with each pixel of the captured image data and determining, using the histogram, a pixel intensity threshold value below which a majority of the pixel intensity values associated with the pixels of the captured image data fall. For instance, the minimum threshold brightness value may be associated with a first pixel intensity threshold value, the optimal threshold brightness value may be associated with a second pixel intensity threshold value, and the second pixel intensity threshold value may be higher than the first pixel intensity threshold value.

Moreover, in a variation of this embodiment, incrementally modifying the focus level associated with the imaging assembly, within the range of focus levels associated with the imaging assembly, to determine an optimal focus level for the imaging assembly at which a sharpness level for the captured image is optimized, at step (d) includes: (i) determining respective sharpness levels for image data captured at each of the minimum focus level, midpoint focus level, and maximum focus level of the range of focus levels; (ii) narrowing the range of focus levels to a modified range of focus levels that is either: (1) a range from the minimum focus level to the midpoint focus level or (2) a range from the midpoint focus level to the maximum focus level, based on the determined sharpness levels for image data captured at each of the minimum focus level, midpoint focus level, and maximum focus level of the range of focus levels; and (iii) determining respective sharpness levels for image data captured at each of a modified minimum focus level, a modified midpoint focus level, and a modified maximum focus level of the modified range of focus levels; and (iv) repeating steps (ii) and (iii), until one of the modified minimum focus level, the modified midpoint focus level, or the modified maximum focus level, of the modified range of focus levels, is an optimal focus level, at which a sharpness level for the captured image data is maximized.

Furthermore, in a variation of this embodiment, the optimal threshold brightness value is a first optimal threshold brightness value, and the method further includes modifying one or more of: minimum or maximum exposure levels, gain levels, illumination intensity levels, or numbers, configurations, or colors of respective illumination banks associated with the imaging assembly, and repeating steps (a) and (e) to determine a second optimal threshold brightness value.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Techniques for automatically tuning the focus and illumination of an industrial fixed vision camera are provided herein. Using the methods provided herein, an installer would set up the camera, place a "training" item in the field of view, and indicate that the automatic tuning process should begin (e.g., by pressing a button, selecting a user interface icon, etc.). For machine vision applications, the training item may include clear, discernable features (e.g., lines, text, etc.), and for barcode applications, the training item may include an attached barcode. Using the methods provided herein, various combinations of different camera parameters may be quickly tried, with images of the training item being captured after each modification, the resulting images may be analyzed, and the process may be repeated until the optimal camera parameters, that result in an image of the training item with sufficient brightness and high clarity, are found. These optimal camera parameters may then be set so that the camera can capture images of other similar items with the same high clarity.

In some examples, after the "optimal camera parameters" are determined, various illumination settings may be modified (while maintaining the optimized focus level) and the tuning process may be repeated to determine a second set of optimal camera parameters. This process may be repeated any number of times, by modifying another of these illumination settings and repeating the turning process, to determine a third set of optimal camera parameters, a fourth set of optimal camera parameters, etc. For instance, if a user selects a "high exposure mode," a minimum exposure level may be increased and the process may be repeated (while maintaining an optimized focus level) to determine a set of optimal camera parameters for "high exposure" mode, if a user selects a "no flash" mode, the illumination intensity levels may be set to zero and the process may be repeated while maintaining an optimized focus level) to determine a set of optimal camera parameters for "no flash mode," etc.

For barcode reading applications, if the barcode attached to the training item is unable to be decoded any point during the tuning process, i.e., due to an increase in illumination intensity, or due to a particular illumination bank being illuminated, the illumination intensity or the number, configuration, or colors of illuminated illumination banks may be modified until the barcode can again be decoded, before the tuning process proceeds.

Figure 1:
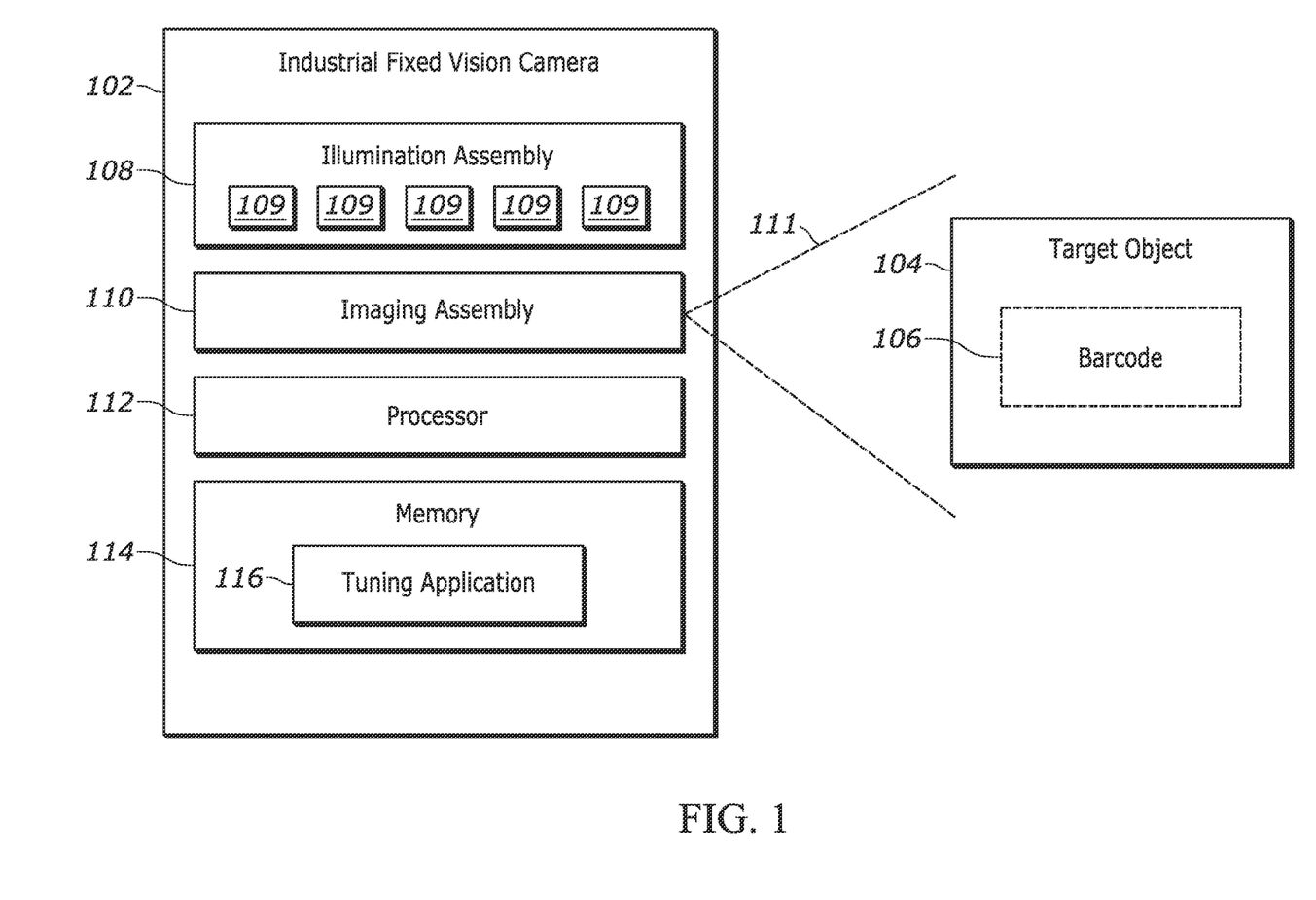
FIG. 1 illustrates a block diagram of an example industrial fixed vision camera that may be automatically tuned for capturing images of target objects affixed with barcodes for subsequent decoding, or for capturing images of target objects for subsequent machine vision identification.
Figure 2:
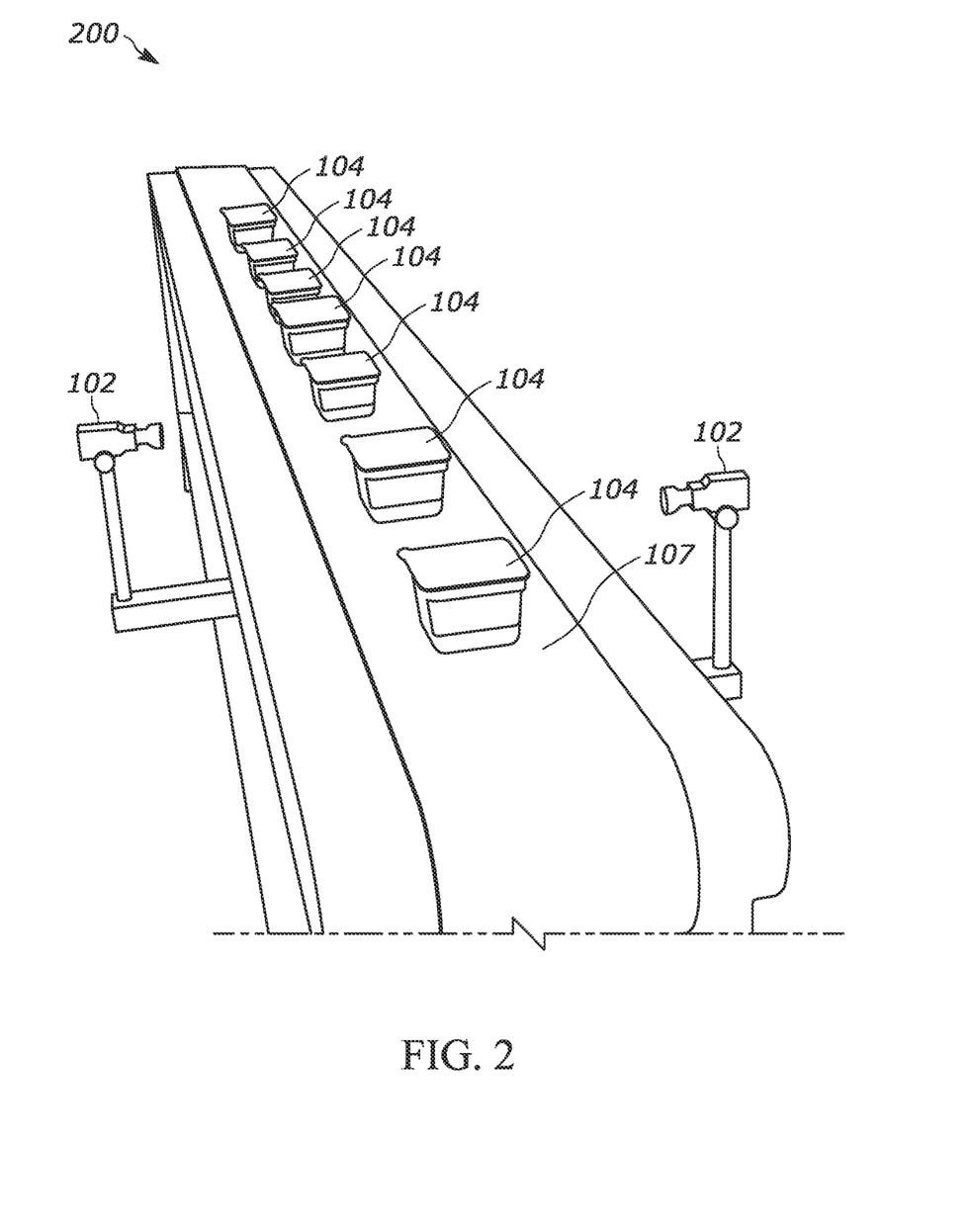
FIG. 2 illustrates an example industrial environment in which the industrial fixed vision camera of FIG. 1 may operate.

FIG. 1 illustrates a block diagram of an example industrial fixed vision camera 102 that may be automatically tuned for capturing images of target objects 104 affixed with barcodes 106 for subsequent decoding, or for capturing images of target objects 104 for subsequent machine vision identification. In some examples, the industrial fixed vision camera 102 may be positioned to operate in an industrial environment. For instance, as shown at FIG. 2, industrial fixed vision cameras 102 may be configured to capture images of target objects 104 on a conveyor belt 107 in an industrial setting 200, such as a factory or warehouse. Referring back to FIG. 1, the industrial fixed vision camera 102 may include (or may otherwise be associated with) an illumination assembly 108, an imaging assembly 110, one or more processors 112, and a memory 114.

The illumination assembly 108 may include a plurality of illumination banks 109 (e.g., LED banks) configured to illuminate the target object 104. The illumination intensity of the illumination banks 109 may be configured to be automatically modified or adjusted. Moreover, the colors of the illumination banks 109, the number of illumination banks 109 that are illuminated, and the configuration of which particular illumination banks 109 are illuminated may all be configured to be automatically modified or adjusted.

The imaging assembly 110 may be configured to capture image data within a field of view 111 (i.e., including a target object 104 that may include a barcode 106). The exposure and gain of the imaging assembly 110 may be configured to be automatically modified or adjusted. Moreover, the focus level (e.g., the focal distance) of the imaging assembly 110 may be configured to be automatically modified or adjusted (e.g., by adjusting diopter).

The one or more processors 112 may interact with the memory 114 to obtain, for example, computer-readable instructions stored in the memory 114. The computer-readable instructions stored in the memory 114, when executed by the one or more processors 112, may cause the one or more processors 112 to execute an automatic tuning application 116. For instance, executing the automatic tuning application 116 may include incrementally modifying or adjusting one or more of the illumination intensity of the illumination banks 109, the colors of the illumination banks 109, the number of illumination banks 109 that are illuminated, the configuration of which particular illumination banks 109 are illuminated, the exposure, the gain, and/or the focus level; capturing images of the target object 104 after modifications or adjustments; and analyzing the captured images, i.e., to determine brightness and/or sharpness of the captured images and/or to attempt to decode a barcode 106 attached to the target object 104 in the captured images, in order to carry out any of the steps of the methods 300 and 400, described in greater detail below with respect to FIGS. 3 and 4, respectively.

Figure 3:
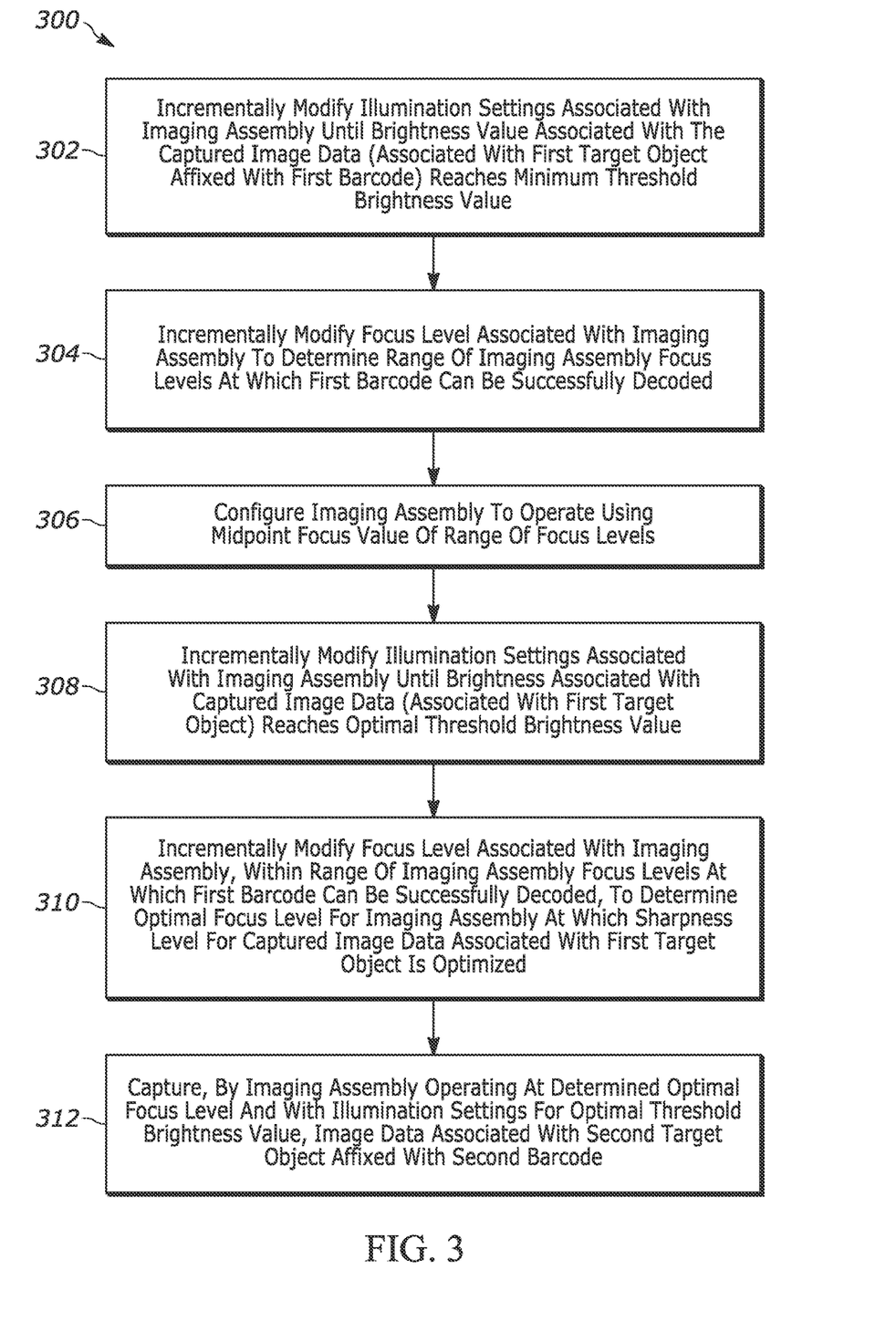
FIG. 3 illustrates a block diagram of an example method as may be implemented by the industrial fixed vision camera of FIG. 1, for automatically tuning the industrial fixed vision camera for capturing images of target objects affixed with barcodes for subsequent decoding.

FIG. 3 illustrates a block diagram of an example method as may be implemented by the industrial fixed vision camera 102 of FIG. 1, for automatically tuning the industrial fixed vision camera 102 for capturing images of target objects affixed with barcodes for subsequent decoding. One or more steps of the method 300 may be implemented as a set of instructions stored on a computer-readable memory (e.g., memory 114) and executable on one or more processors (e.g., processors 112).

At block 302, illumination settings associated with an imaging assembly configured to capture images of a first target object affixed with a first barcode may be incrementally modified until a brightness value associated with captured image data reaches a minimum threshold brightness value. For instance, the illumination settings associated with the imaging assembly may include exposure, gain, illumination intensity, number of illuminated illumination banks associated with the imaging assembly, etc. Generally speaking, each of the illumination settings are initially set at their minimum values, and after each incremental modification (generally an increase), the captured image data may be analyzed to determine whether the minimum threshold brightness value has been reached or not.

For instance, determining the brightness value associated with the captured image data may include creating a histogram of pixel intensity values associated with each pixel of the captured image data and determining, using the histogram, a pixel intensity threshold value below which a majority of the pixel intensity values associated with the pixels of the captured image data fall. For instance, the minimum threshold brightness value may be associated with a first pixel intensity threshold value, and an optimal threshold brightness value is associated with a second pixel intensity threshold value that is higher than the first pixel intensity threshold value.

If the minimum threshold brightness value has not yet been reached, the illumination settings may be further incrementally modified until the minimum threshold brightness value is reached. For instance, modifying these illumination settings may include first incrementally increasing an exposure level associated with the imaging assembly from a minimum exposure value to a maximum exposure value (and checking the brightness value of the captured image data after each increase, as discussed above). If the exposure level is increased to its maximum value, and the brightness value has not reached the minimum threshold brightness level, the exposure value is reset to its minimum value and the gain level associated with the imaging assembly is increased by one increment from the minimum gain level. The exposure level is then incrementally increased from minimum to maximum while the increased gain is maintained, with the brightness value of the captured image data checked after each increase, as discussed above. If the exposure level is increased to its maximum value, with the increased gain maintained, and the brightness value has not reached the minimum threshold brightness level, the exposure value is reset to its minimum value and the gain level associated with the imaging assembly is increased by an additional increment from the minimum gain level. This is repeated until both the gain and exposure levels are at their maximum values.

In a similar manner, the gain and exposure levels are reset to their minimum values and the illumination level or intensity associated with the imaging assembly is increased by one increment. If the exposure, and subsequently gain, values are again incrementally increased to their maximum, with the illumination level or intensity maintained at the increased value, and the brightness value has not reached the minimum threshold brightness level, the illumination level or intensity is then increased by another increment. This is repeated until the gain, exposure, and illumination level or intensity are at their maximum values.

In a similar manner, the gain, exposure, and illumination level or intensity are reset to their minimum values and the number of illuminated illumination banks associated with the imaging assembly are increased by one. If the exposure, and subsequently gain and illumination level or intensity values are again incrementally increased to their maximum, with the number of illuminated illumination banks maintained at the increased level, and the brightness value has not reached the minimum threshold brightness level, the number of illuminated illumination banks is then increased by one again. This is repeated until the gain, exposure, illumination level or intensity, and number of illuminated illumination banks are at their maximum values, or the minimum threshold brightness level is reached.

At block 304, the focus level (e.g., the focal distance or focal length) associated with the imaging assembly may be incrementally modified (e.g., by adjusting diopter) in order to determine a range of imaging assembly focus levels at which the first barcode can be successfully decoded. Generally speaking, after each incremental modification of the imaging assembly's focus level, the captured image data may be analyzed to determine whether the barcode can be successfully decoded or not.

This incremental modification may include first incrementally increasing the focus level, starting from a minimum focus level, by a first focus level increment, and an attempt to decode the first barcode is made after each incremental focus level increase. In some examples, the first focus level increment is the smallest focus level increment permitted by the imaging assembly. This is repeated until the first barcode can be successfully decoded. The focus level at which the barcode can first be successfully decoded is then considered the minimum threshold focus level.

The focus level of the imaging assembly may then be incrementally increased starting at the minimum threshold focus level, by a second focus level increment, and a an attempt to decode the first barcode is made after each incremental focus level increase. In some examples, the second focus level increment is the same as the first focus level increment, while in other examples, the second focus level increment is a larger increment. This is repeated until the first barcode can no longer be successfully decoded, i.e., when the focus level reaches an overshot focus level.

The focus level of the imaging assembly may then be incrementally decreased starting at the overshot focus level, by the first focus level increment, and an attempt to decode the first barcode is made after each incremental focus level decrease. This is repeated until the first barcode can again be successfully decoded. The focus level at which the barcode can again be successfully decoded is considered a maximum threshold focus level.

The range of imaging assembly focus levels at which the first barcode can be successfully decoded is thus determined to be the range from the minimum threshold focus level to the maximum threshold focus level.

At block 306, the imaging assembly may be configured to operate using a midpoint focus value of the range of focus levels. For instance, if the minimum threshold focus level was 20 and the maximum threshold focus level was 40, the midpoint focus value would be 30.

At block 308, the illumination settings associated with the imaging assembly may be incrementally modified until the brightness associated with the captured image data reaches the optimal threshold brightness value, in a similar manner as discussed above with respect to block 302. Generally speaking, after each incremental modification, the captured image data may be analyzed to determine whether the first barcode can still be successfully decoded. If at any point the first barcode is unable to be successfully decoded, one or more of the illumination intensity level associated with the imaging assembly, or the number, colors, or configuration of illumination banks associated with the imaging assembly that are illuminated may be modified using a binary search algorithm until the first barcode can again be successfully decoded. Once the first barcode can again be successfully decoded, the incremental modification of the illumination settings may continue until the brightness associated with the captured image data reaches the optimal threshold brightness value.

At block 310, the focus level (e.g., focal length or focal distance) associated with the imaging assembly may be incrementally modified (e.g., by adjusting diopter), within the range of imaging assembly focus levels at which the first barcode can be successfully decoded, to determine an optimal focus level for the imaging assembly at which a sharpness level (e.g., based on resolution, acutance, etc.) for the captured image data is optimized (e.g., high resolution, high acutance, etc.). Generally speaking, after each incremental modification of the imaging assembly's focus level, the captured image data may be analyzed to determine a measure or value of the sharpness of the image.

Incrementally modifying the focus level associated with the imaging assembly to determine the optimal focus level for the imaging assembly may include first determining respective sharpness levels for image data captured at each of the minimum threshold focus level, midpoint focus level, and maximum threshold focus level of the range of focus levels. The range of focus levels may then be narrowed to a modified range of focus levels, either from the minimum threshold focus level to the midpoint focus level, or the midpoint focus level to the maximum focus level, based on the calculated sharpness values. For instance, if the midpoint and maximum threshold focus level are associated with higher sharpness values than the minimum threshold focus level, the range may be narrowed to a range from the midpoint to maximum threshold focus level, but if the midpoint and minimum threshold focus level are associated with higher sharpness values than the maximum threshold focus level, the range may be narrowed to a range from the midpoint to minimum threshold focus level. Sharpness levels for the new minimum, midpoint, and maximum focus levels of the modified range may then be determined and the modified range may be narrowed to a new modified range in a similar manner. The range may continue to be narrowed in this way until one of the modified minimum focus level, the modified midpoint focus level, or the modified maximum focus level, of the modified range of focus levels, is an optimal focus level, at which a sharpness level for the captured image data is maximized, or until the difference between the modified minimum, midpoint, or maximum focus levels or sharpness values associated therewith falls below a threshold value.

At block 312, the imaging assembly may operate with the determined optimal focus level from block 310 and with illumination settings for the optimal threshold brightness value from block 308 to capture image data associated with a second target object affixed with a second barcode. The captured image data associated with the second target object affixed with the second barcode (and various subsequent target objects affixed with respective barcodes) may then be analyzed to decode the second barcode (and other subsequent barcodes).

In some examples, the method 300 may include determining additional variations on the illumination settings for the optimal threshold brightness value, by maintaining the optimal focus level from block 310 and modifying one or more of the minimum or maximum exposure levels, gain levels, illumination intensity levels, or numbers, colors, or configurations of illuminated illumination banks associated with the imaging assembly, or colors of respective illumination banks associated with the imaging assembly, and repeating blocks 302 and 308 to determine a second optimal threshold brightness value.

Figure 4:
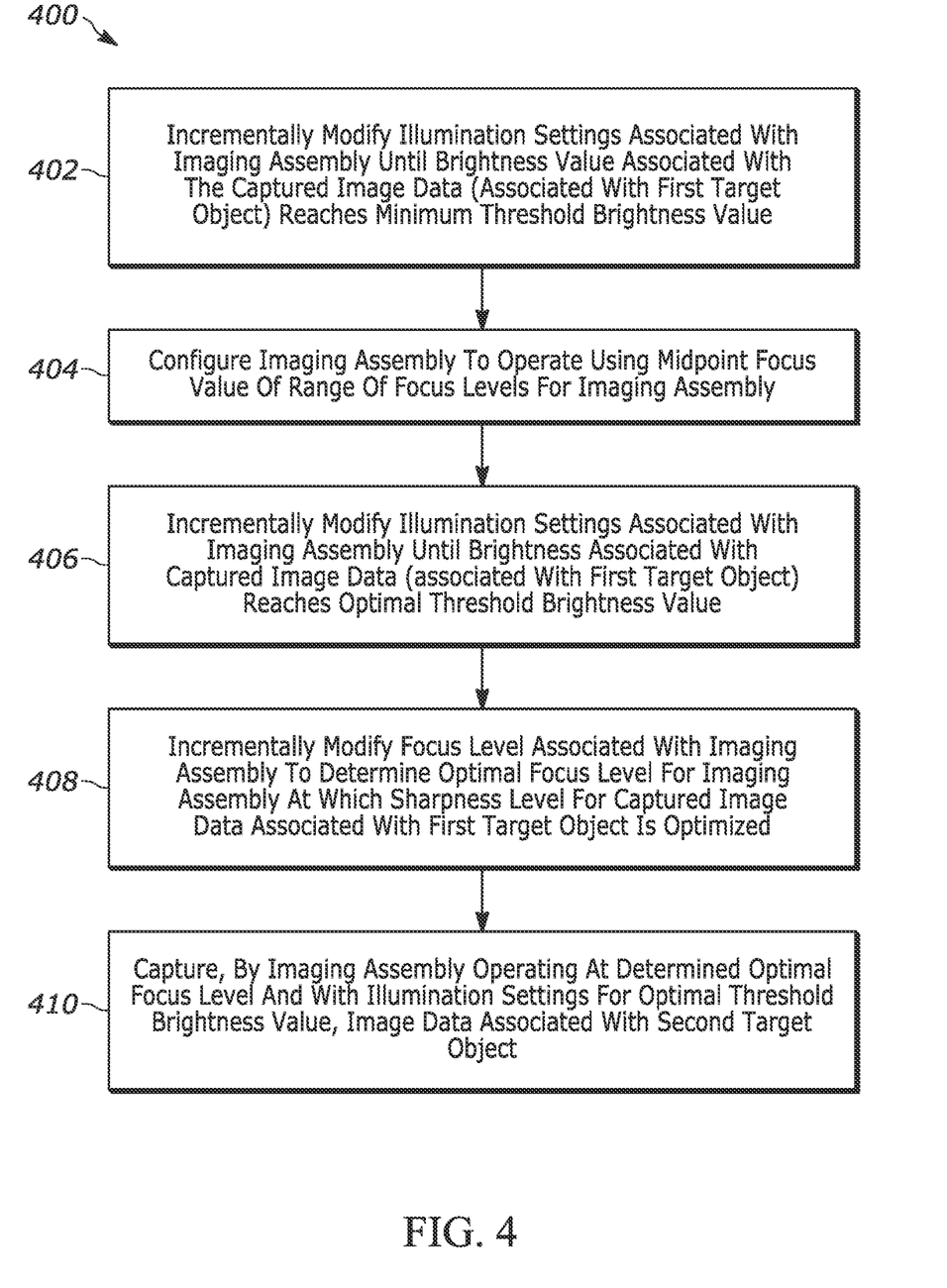
FIG. 4 illustrates a block diagram of an example method as may be implemented by the industrial fixed vision camera of FIG. 1, for automatically tuning the industrial fixed vision camera for capturing images of target objects for subsequent machine vision identification.

FIG. 4 illustrates a block diagram of an example method 400 as may be implemented by the industrial fixed vision camera 102 of FIG. 1, for automatically tuning the industrial fixed vision camera 102 for capturing images of target objects for subsequent machine vision identification. One or more steps of the method 400 may be implemented as a set of instructions stored on a computer-readable memory (e.g., memory 114) and executable on one or more processors (e.g., processors 112).

At block 402, illumination settings associated with an imaging assembly configured to capture images of a first target object may be incrementally modified until a brightness value associated with captured image data reaches a minimum threshold brightness value. For instance, the illumination settings associated with the imaging assembly may include exposure, gain, illumination intensity, number of illuminated illumination banks associated with the imaging assembly, etc. Generally speaking, each of the illumination settings are initially set at their minimum values, and after each incremental modification (generally an increase), the captured image data may be analyzed to determine whether the minimum threshold brightness value has been reached or not.

For instance, determining the brightness value associated with the captured image data may include creating a histogram of pixel intensity values associated with each pixel of the captured image data and determining, using the histogram, a pixel intensity threshold value below which a majority of the pixel intensity values associated with the pixels of the captured image data fall. For instance, the minimum threshold brightness value may be associated with a first pixel intensity threshold value, and an optimal threshold brightness value is associated with a second pixel intensity threshold value that is higher than the first pixel intensity threshold value.

If the minimum threshold brightness value has not yet been reached, the illumination settings may be further incrementally modified until the minimum threshold brightness value is reached. For instance, modifying these illumination settings may include first incrementally increasing an exposure level associated with the imaging assembly from a minimum exposure value to a maximum exposure value (and checking the brightness value of the captured image data after each increase, as discussed above). If the exposure level is increased to its maximum value, and the brightness value has not reached the minimum threshold brightness level, the exposure value is reset to its minimum value and the gain level associated with the imaging assembly is increased by one increment from the minimum gain level. The exposure level is then incrementally increased from minimum to maximum while the increased gain is maintained, with the brightness value of the captured image data checked after each increase, as discussed above. If the exposure level is increased to its maximum value, with the increased gain maintained, and the brightness value has not reached the minimum threshold brightness level, the exposure value is reset to its minimum value and the gain level associated with the imaging assembly is increased by an additional increment from the minimum gain level. This is repeated until both the gain and exposure levels are at their maximum values.

In a similar manner, the gain and exposure levels are reset to their minimum values and the illumination level or intensity associated with the imaging assembly is increased by one increment. If the exposure, and subsequently gain, values are again incrementally increased to their maximum, with the illumination level or intensity maintained at the increased value, and the brightness value has not reached the minimum threshold brightness level, the illumination level or intensity is then increased by another increment. This is repeated until the gain, exposure, and illumination level or intensity are at their maximum values.

In a similar manner, the gain, exposure, and illumination level or intensity are reset to their minimum values and the number of illuminated illumination banks associated with the imaging assembly are increased by one. If the exposure, and subsequently gain and illumination level or intensity values are again incrementally increased to their maximum, with the number of illuminated illumination banks maintained at the increased level, and the brightness value has not reached the minimum threshold brightness level, the number of illuminated illumination banks is then increased by one again. This is repeated until the gain, exposure, illumination level or intensity, and number of illuminated illumination banks are at their maximum values, or the minimum threshold brightness level is reached.

At block 404, the imaging assembly may be configured to operate using a midpoint focus value of the range of focus levels associated with the imaging assembly. For instance, if the minimum focus level possible for the imaging assembly is 20 and the maximum focus level possible for the imaging assembly is 40, the midpoint focus value would be 30.

At block 406, the illumination settings associated with the imaging assembly may be incrementally modified until the brightness associated with the captured image data reaches an optimal threshold brightness value, in a similar manner as discussed above with respect to block 402.

At block 408, the focus level associated with the imaging assembly may be incrementally modified (e.g., by adjusting diopter) to determine an optimal focus level for the imaging assembly at which a sharpness level (e.g., based on resolution, acutance, etc.) for the captured image data is optimized (e.g., based on high resolution, high acutance, etc.). Generally speaking, after each incremental modification of the imaging assembly's focus level, the captured image data may be analyzed to determine a measure or value of the sharpness of the image.

Incrementally modifying the focus level associated with the imaging assembly to determine the optimal focus level for the imaging assembly may include first determining respective sharpness levels for image data captured at each of the minimum focus level, midpoint focus level, and maximum focus level of the range of focus levels for the imaging assembly. The range of focus levels may then be narrowed to a modified range of focus levels, either from the minimum focus level to the midpoint focus level, or the midpoint focus level to the maximum focus level, based on the calculated sharpness values. For instance, if the midpoint and maximum focus level are associated with higher sharpness values than the minimum focus level, the range may be narrowed to a range from the midpoint to maximum focus level, but if the midpoint and minimum focus level are associated with higher sharpness values than the maximum focus level, the range may be narrowed to a range from the midpoint to minimum focus level. Sharpness levels for the new minimum, midpoint, and maximum focus levels of the modified range may then be determined and the modified range may be narrowed to a new modified range in a similar manner. The range may continue to be narrowed in this way until one of the modified minimum focus level, the modified midpoint focus level, or the modified maximum focus level, of the modified range of focus levels, is an optimal focus level, at which a sharpness level for the captured image data is maximized, or until the difference between the modified minimum, midpoint, or maximum focus levels or sharpness values associated therewith falls below a threshold value.

At block 410, the imaging assembly may operate with the determined optimal focus level and with illumination settings for the optimal threshold brightness value to capture image data associated with a second target object. The captured image data associated with the second target object (and various subsequent target objects) may then be analyzed to identify the second target object (and other subsequent objects).

In some examples, the method 400 may include determining additional variations on the illumination settings for the optimal threshold brightness value, by maintaining the optimal focus level from block 408 and modifying one or more of the minimum or maximum exposure levels, gain levels, illumination intensity levels, or numbers, colors, or configurations of illuminated illumination banks associated with the imaging assembly, or colors of respective illumination banks associated with the imaging assembly, and repeating blocks 402 and 406 to determine a second optimal threshold brightness value.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method, comprising:
   tuning an imaging assembly configured to capture image data associated with a first target object, by:
   (a) incrementally modifying illumination settings associated with the imaging assembly until a brightness value associated with the captured image data reaches a minimum threshold brightness value;
   (b) configuring the imaging assembly to operate using a midpoint focus value of a range of focus levels associated with the imaging assembly;
   (c) incrementally modifying the illumination settings associated with the imaging assembly until the brightness value associated with the captured image data reaches an optimal threshold brightness value; and
   (d) incrementally modifying a focus level associated with the imaging assembly, within the range of focus levels associated with the imaging assembly, to determine an optimal focus level for the imaging assembly at which a sharpness level for the captured image data is optimized; and
   capturing, by the imaging assembly, operating at the determined optimal focus level, and with illumination settings for the optimal threshold brightness value, image data associated with a second target object.

2. The method of claim 1, wherein the illumination settings associated with the imaging assembly include one or more of an exposure, a gain, an illumination intensity, or a number of illuminated illumination banks associated with the imaging assembly.

3. The method of claim 2, wherein incrementally modifying the illumination settings associated with the imaging assembly at steps (a) and (c) includes:
   (i) incrementally increasing an exposure level associated with the imaging assembly from a minimum exposure value to a maximum exposure value;
   (ii) when the exposure level associated with the imaging assembly is set to the maximum exposure value, incrementally increasing a gain level associated with the imaging assembly, by one increment, from a minimum gain value and repeating step (i);
   (iii) when the gain level associated with the imaging assembly is set to a maximum gain value, and the exposure level associated with the imaging assembly is set to the maximum exposure value, incrementally increasing an illumination intensity level associated with the imaging assembly, by one increment, from a minimum illumination intensity value and repeating steps (i)-(ii); and
   (iv) when the illumination level associated with the imaging assembly is set to the maximum illumination value, the gain level associated with the imaging assembly is set to the maximum gain value, and the exposure level associated with the imaging assembly is set to the maximum exposure value, incrementally increasing a number of illumination banks associated with the imaging assembly that are illuminated, by one, from a minimum number of illuminated illumination banks, and repeating steps (i)-(iii), until a maximum number of illumination banks associated with the imaging assembly are illuminated.

4. The method of claim 1, wherein determining the brightness value associated with the captured image data includes creating a histogram of pixel intensity values associated with each pixel of the captured image data and determining, using the histogram, a pixel intensity threshold value below which a majority of the pixel intensity values associated with the pixels of the captured image data fall.

5. The method of claim 4, wherein the minimum threshold brightness value is associated with a first pixel intensity threshold value, wherein the optimal threshold brightness value is associated with a second pixel intensity threshold value, and wherein the second pixel intensity threshold value is higher than the first pixel intensity threshold value.

6. The method of claim 1, wherein incrementally modifying the focus level associated with the imaging assembly, within the range of focus levels associated with the imaging assembly, to determine an optimal focus level for the imaging assembly at which a sharpness level for the captured image is optimized, at step (d) includes:
   (i) determining respective sharpness levels for image data captured at each of the minimum focus level, midpoint focus level, and maximum focus level of the range of focus levels;
   (ii) narrowing the range of focus levels to a modified range of focus levels that is either:
   (1) a range from the minimum focus level to the midpoint focus level or (2) a range from the midpoint focus level to the maximum focus level, based on the determined sharpness levels for image data captured at each of the minimum focus level, midpoint focus level, and maximum focus level of the range of focus levels; and
   (iii) determining respective sharpness levels for image data captured at each of a modified minimum focus level, a modified midpoint focus level, and a modified maximum focus level of the modified range of focus levels; and
   (iv) repeating steps (ii) and (iii), until one of the modified minimum focus level, the modified midpoint focus level, or the modified maximum focus level, of the modified range of focus levels, is an optimal focus level, at which a sharpness level for the captured image data is maximized.

7. The method of claim 1, wherein the optimal threshold brightness value is a first optimal threshold brightness value, the method further comprising:

modifying one or more of: minimum or maximum exposure levels, gain levels, illumination intensity levels, or numbers, colors, or configurations of illuminated illumination banks associated with the imaging assembly, and repeating steps (a) and (d) to determine a second optimal threshold brightness value.

* * * * *